United States Patent
Elwakil et al.

(10) Patent No.: US 10,922,056 B1
(45) Date of Patent: Feb. 16, 2021

(54) ATMOSPHERIC PRESSURE AIR MICROPLASMA SYSTEM FOR TRUE RANDOM BIT GENERATION

(71) Applicant: DESC (Dubai Electronic Security Center), Dubai (AE)

(72) Inventors: Ahmed Elsayed Elwakil, Sharjah (AE); Anis Allagui, Sharjah (AE); Sohaib Majzoub, Sharjah (AE); Hussain Alawadhi, Sharjah (AE)

(73) Assignee: DESC (DUBAI ELECTRONIC SECURITY CENTER), Dubai (AE)

( * ) Notice: Subject to any disclaimer, the term of this patent is extended or adjusted under 35 U.S.C. 154(b) by 0 days.

(21) Appl. No.: 16/858,109

(22) Filed: Apr. 24, 2020

(51) Int. Cl.
*H05B 7/18* (2006.01)
*H05H 1/24* (2006.01)
*G06F 7/58* (2006.01)
*H04L 9/00* (2006.01)

(52) U.S. Cl.
CPC .............. *G06F 7/588* (2013.01); *H04L 9/003* (2013.01)

(58) Field of Classification Search
CPC . H05B 7/11; H05B 7/144; H05B 7/18; H05H 1/24; H05H 2001/2431; G06F 7/58–588
See application file for complete search history.

(56) References Cited

U.S. PATENT DOCUMENTS

| | | | | |
|---|---|---|---|---|
| 7,091,481 B2 * | 8/2006 | Miller | ................... | G01N 27/624 250/286 |
| 8,089,323 B2 * | 1/2012 | Tarng | ..................... | H03B 5/124 331/117 FE |
| 8,529,749 B2 * | 9/2013 | Sankaran | ............... | B82Y 40/00 205/560 |
| 2006/0249391 A1 * | 11/2006 | Jin | ......................... | G03F 7/0002 205/118 |
| 2012/0021132 A1 * | 1/2012 | Shimizu | ................ | C23C 14/083 427/453 |
| 2013/0052365 A1 * | 2/2013 | Liu | ...................... | C23C 16/5096 427/527 |
| 2016/0336154 A1 * | 11/2016 | Watanabe | ......... | H01J 37/32192 |
| 2019/0269902 A1 * | 9/2019 | Fregoso | ............... | A61N 1/0548 |

OTHER PUBLICATIONS

English translation of JP 2011108615 to Takahashi (Year: 2011).*
(Continued)

*Primary Examiner* — Michael A Laflame, Jr.
(74) *Attorney, Agent, or Firm* — Hayes Soloway PC

(57) ABSTRACT

There is provided an atmospheric pressure air microplasma system designed for random bit generation including a plurality of plasma electrodes, a power supply module supplying a DC voltage for igniting an arc discharge between the plurality of plasma electrodes, wherein the ignited arc discharge results in establishing and sustaining an arc current channel between the plurality of plasma electrodes, a current probe for measuring and collecting electric current time series data from the arc current channel, and a data acquisition board connected to the current probe for saving the collected electric current time series data, wherein binary sequences are generated from the electric current time series data. Further, the generated binary sequences are proven to pass all 15 tests of NIST Statistical Test Suite and thereby prove to qualify as random sequences.

17 Claims, 5 Drawing Sheets

(56) References Cited

OTHER PUBLICATIONS

A.M. Abid, "Implementation of an Encrypted Wireless Communication System Using Nested Chaotic Maps", Journal, Dec. 2010, 4087-4096, vol. 20, No. 12, International Journal of Bifurcation and Chaos, World Scientific Publishing Company.

Manuel Blum, "How to Generate Cryptographically Strong Sequences for Pseudo-Random Bits", Journal, Nov. 1984, 850-864, vol. 13, No. 4, SIAM Journal of Computing, Society for Industrial and Applied Mathematics.

Shuqin Zhu, "A Class of Quadratic Polynomial Chaotic Maps and Its Application in Cryptography", Article, 2019, 34141-34152, vol. 7, IEEE Access.

Abinash Mohanty, "RTN in Scaled Transistors for On-Chip Random Seed Generation" Journal, 2017, 2248-2257, vol. 25, No. 8, IEEE Transactions on Very Large Scale Integration (VLSI) Systems.

Xiaoming Chen, "Modeling Random Telegraph Noise as a Randomness Source and Its Application in True Random Number Generation" Journal, 2015, 1435-1448, vol. 35, No. 9, IEEE Transactions on Computer-Aided Design of Integrated Circuits and Systems.

Biswajit Ray, "True Random Number Generation Using Read Noise of Flash Memory Cells" Journal, 2018, 963-969, vol. 65, No. 3, IEEE Transactions on Electron Devices.

Fang Tang, "CMOS On-Chip Stable True-Random ID Generation Using Antenna Effect", Journal, 2014, 54-56, vol. 35, No. 1, IEEE Electron Device Letters.

Matthew Jerry, "Stochastic Insulator-to-Metal Phase Transition based True Random Number Generator", Journal, 2018, 139-142, vol. 39, No. 1, IEEE Electron Device Letters.

M. Sciamanna, "Physics and Applications of Laser Diode Chaos", Article, 2015, 151-162, vol. 9, Nature Photonics.

Simone Balatti, "True Random Number Generation by Variability of Resistive Switching in Oxide-Based Devices" Journal, 2015, 214-221, vol. 5, No. 2, IEEE Journal on Emerging and Selected Topics in Circuits and Systems.

Yuan Ma, "Entropy Estimation for ADC Sampling based True Random Number Generators", Journal, 2019, 2887-2900, vol. 14, No. 11, IEEE Transactions on Information Forensics and Security.

Piotr Zbigniew Wieczorek, "True Random Number Generator Based on Flip-Flop Resolve Time Instability Boosted by Random Chaotic Source", Journal, 2018, 1279-1292, vol. 65, No. 4, IEEE Transactions on Circuits and Systems—I: Regular Papers.

Mingjiang Zhang, "A Hybrid Integrated Short-External-Cavity Chaotic Semiconductor Laser", Journal, 2017, 1911-1914, vol. 29, vol. 21, IEEE Photonics Technology Letters.

Nianqiang Li, "Two Approaches for Ultrafast Random Bit Generation Based on the Chaotic Dynamics of a Semiconductor Laser", Journal, 2014, 6634-6646, vol. 22, No. 6, Optics Express.

Susumu Shinohara, "Chaotic Laser Based Physical Random Bit Streaming System with a Computer Application Interface", Article, 2017, 6461-6474, vol. 25, No. 6, Optics Express.

Apostolos Argyris, "Gb/s One-Time-Pad Data Encryption with Synchronized Chaos-Based True Random Bit Generators", Journal, 2016, 5325-5331, vol. 34, No. 22, Journal of Lightwave Technology.

Kazusa Ugajin, "Real-Time Fast Physical Random Number Generator with a Photonic Integrated Circuit", Article, 2017, 6511-6523, vol. 25, No. 6, Optics Express.

Marcin Piotr Pawlowski, "Harvesting Entropy for Random Number Generation for Internet of Things Constrained Devices Using On-Board Sensors", Article, 2015, 26838-26865, vol. 15, Sensors.

Andrea Espinel Rojas, "True Random Bit Generators Based on Current Time Series of Contact Glow Discharge Electrolysis", Journal, 2018, 1-6, vol. 123, No. 20, Journal of Applied Physics, American Institute of Physics.

Anis Allagui, "Nonlinear Time-Series Analysis of Current Signal in Cathodic Contact Glow Discharge Electrolysis", Journal, 2016, 1-8, vol. 119, Journal of Applied Physics, American Institute of Physics.

Anis Allagui, "Portable Atmospheric Pressure Air Microplasma System for True Random Bit Generation from Current Time Series", Journal, 2020, 1-10, Journal of Applied Physics.

* cited by examiner

ATMOSPHERIC PRESSURE AIR MICROPLASMA SYSTEM FOR TRUE RANDOM BIT GENERATION

FIELD OF THE INVENTION

The present invention relates to the field of true random bit generation in a cryptographic system, and more particularly to a true random bit generator using an atmospheric pressure air microplasma system as a physical source of entropy.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

A microplasma is a plasma of small dimensions, ranging from tens to thousands of micrometers, and can be generated at a variety of temperatures and pressures, existing as either thermal or non-thermal plasmas. Non-thermal microplasmas can be easily sustained and manipulated under standard conditions, and are therefore employed in various commercial, industrial and medical applications. Microplasma confined to dimensions in the order of millimeters or below are known to be remarkably stable at high pressures. This allows self-sustained and continuous operation without filamentation and glow-to-arc transition. In addition, a complete microplasma system can be reduced in size, made lightweight and in various design geometries or configurations. When air at atmospheric pressure is used as plasma gas (with no specialized housing or vacuum equipment), microplasma becomes cost-effective and easy to operate. These advantages make microplasmas ideal for portable systems and instruments for chemical and spectrochemical analysis, thin film deposition, $NO_x$ and $SO_x$ remediation and treatment of volatile organic compounds, biomedical decontamination, dental sterilization and many other applications.

A majority of applications based on microplasmas rely on the fact that microplasmas provide a rich environment of high-energy electrons, or any other reactive, excited and metastable species, ultraviolet radiations and intense electric fields without the generation of excessive heat. In high-pressure and atmospheric pressure microplasmas in particular, charged and uncharged species are actually in non-local equilibrium with the electric field due to the large and non-monotonous profiles of the latter, and also due to the small dimensions of the system. This non-equilibrium character of microplasma and erratic movement of its elements which manifests itself, for instance, as high-frequency electrical current fluctuations (coupled with others, such as acoustic and optical fluctuations) has been shown to be useful for another type of application, which is high-rate random bit generation (RBG). RBG is very important in cryptographic systems, communication, Monte-Carlo numerical simulations and calculations, statistical research, randomized algorithms, etc.

Today's solutions to generate RBGs mostly rely either on software-based computational algorithms (e.g. iterated maps or the Blum-Micali algorithms) or on hardwired electronic circuitry (e.g. the Linear-Feedback-Shift-Registers). While these methods are cost-effective and relatively fast, the generated sequences are not truly random, no matter how complex or nonlinear the systems are. Meanwhile, RBGs in Hardware Security Modules (HSMs) rely on digital techniques (such as harvesting phase noise in ring oscillators, or post-processing chaotic sequences generated by a chaotic oscillator) in order to be compatible with the CMOS technology used for fabricating the remaining parts of the security-dedicated crypto-processors. However, relying on these on-chip RBGs has its own limitations in terms of speed and vulnerability to attacks. For example, Differential Power Analysis (DPA) can be used to extract the data being processed by analyzing the current drawn by the processor from the chip power supply. Defenses against this class of attacks include (for example) using random clocks or to randomly include no operation instructions (NOP) in the device instruction stream. Such defenses obviously require more hardware overhead and increased design complexity. Chip makers use tools to simulate possible non-invasive attacks to perform any needed improvements before a chip is fabricated.

By contrast, RBGs needed for high-speed real-time encryption applications mostly rely on off-chip optical sources of entropy such as chaotic lasers. Some lower speed systems also rely on harvesting noise from multiple sensors, including temperature, humidity, visible light and infrared light sensors. These entropy sources have the advantage of being immune to power supply attacks, but also require subsequent digital signal post-processing platform to generate true random bits.

From the above description of traditional systems, it becomes clear that high-speed off-chip entropy sources needed for true RBGs (TRBGs) are up to this day mostly optical in nature. This comes with a high system complexity that requires optoelectronic circuits and other optical parts (e.g. optical amplifiers, waveguides, mirrors, etc.) in order to harvest reliable signals for TRBGs. Apart from the complexity of the optical systems and the necessity for high precision adjustment and alignment, they still require further digital post-processing on the acquired raw binarized data because they are only chaos based.

Accordingly, there exists a need for true high-rate RBG using a physical source of entropy, which overcomes the disadvantages of previously or traditionally deployed techniques or systems.

SUMMARY OF THE INVENTION

Therefore it is an objective of the present invention to provide a True Random Bit Generator (TRBG) for cryptographic systems (and other related applications) using an atmospheric pressure air microplasma system as a physical source of entropy.

The present invention involves an atmospheric pressure air microplasma system designed for random bit generation, comprising a plurality of plasma electrodes, a power supply module supplying a DC voltage for igniting an arc discharge between the plurality of plasma electrodes, wherein the ignited arc discharge results in establishing and sustaining an arc current channel between the plurality of plasma electrodes, a current probe for measuring and collecting electrical current-time series data from the arc current channel; and a data acquisition board connected to the current probe for saving the collected electrical current-time series data, wherein binary sequences are generated from the electrical current-time series data.

In an embodiment of the present invention, two plasma electrodes are aligned facing each other at a distance of 1 mm to 1 cm.

In an embodiment of the present invention, the two plasma electrodes are two needle-like electrodes.

In an embodiment of the present invention, the binary sequences are generated through a direct decimal-to-binary conversion of the electric current time series data.

In an embodiment of the present invention, the generated binary sequences are proven to pass all 15 tests of NIST Statistical Test Suite and thereby prove to qualify as random sequences.

In an embodiment of the present invention, the generated binary sequences qualify as random sequences without requiring post-processing of the generated binary sequences.

In an embodiment of the present invention, the atmospheric pressure air microplasma system is battery-powered thereby resulting in a portable and inexpensive source for true random bit generation (TRBG).

In an embodiment of the present invention, the power supply module further comprises a MOSFET transistor, a step-up transformer, a diode and an RC filter powered by a rechargeable lithium-ion battery.

In an embodiment of the present invention, the data acquisition board is further connected to a computer.

In an embodiment of the present invention, the arc current channel is established between cathodic and anodic tips of the plurality of plasma electrodes, through electron thermionic emission and/or field emission.

In an embodiment of the present invention, the atmospheric pressure air microplasma system is resilient to external power attacks.

In an embodiment of the present invention, the ignited arc discharge is visible or non-visible with the naked eye.

As another aspect of the present invention, a true random bit generator (TRBG) using atmospheric pressure air microplasma as a source of entropy is disclosed for random bit generation in a cryptographic system, the true random bit generator comprising a generator switching circuit for generating a high-voltage microplasma between two electrodes in open air, thereby eliminating a need for optical source and components for random bit generation, wherein the generator switching circuit is powered by a low voltage DC supply.

In an embodiment of the present invention, the true random bit generator (TRBG) relies on a use of current fluctuations in the atmospheric pressure air microplasma as the source of entropy for random bit generation.

In an embodiment of the present invention, electric current time series data measured from the atmospheric pressure air microplasma is used as the sole source of entropy for random bit generation.

In an embodiment of the present invention, the true random bit generator (TRBG) eliminates a need for digital post processing of binarized data in order to qualify bit streams as random sequences.

In an embodiment of the present invention, the atmospheric pressure air microplasma is generated between tip of a needle electrode and a concentrated anolyte or catholyte of moving interface.

In an embodiment of the present invention, the true random bit generator (TRBG) further comprises a passive current sensor interfaced to a computer via a data acquisition module.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which—

FIG. 4 ($b$) shows histogram plots for a sample of 96000 data points (arbitrarily selected from 16 MS) collected at the rates 10, 50 and 100 MS/s, in accordance with the present invention.

FIG. 4 ($c$) depicts probability plots, in accordance with the present invention.

FIG. 4($d$)-4($f$) graphically show uniform distribution for bits '0' and '1' wherein probability of occurrence is P (0)=P (1)=0.5 for each rate, in accordance with the present invention.

DETAILED DESCRIPTION OF THE INVENTION

Figure 1:
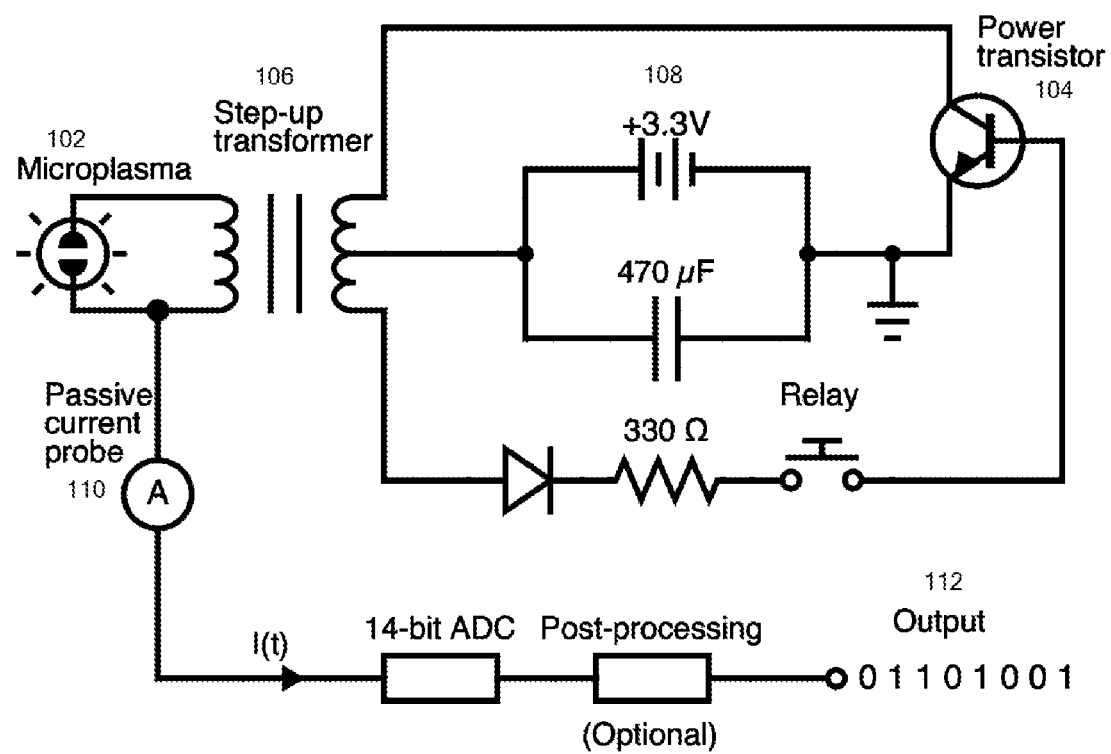
FIG. 1 depicts a photograph of a first prototype of a battery-powered atmospheric pressure air microplasma system designed and investigated for random bit generation in accordance with the present invention.

The aspects of the method and system to provide a true random bit generator (TRBG) in a cryptographic system using an atmospheric pressure air microplasma system as a physical source of entropy according to the present invention, will be described in conjunction with FIGS. 1-5. In the Detailed Description, reference is made to the accompanying figures, which form a part hereof, and in which is shown by way of illustration specific embodiments in which the invention may be practiced. It is to be understood that other embodiments may be utilized, and logical changes may be made without departing from the scope of the present invention. The following detailed description, therefore, is not to be taken in a limiting sense, and the scope of the present invention is defined by the appended claims.

A true random bit generator (TRBG) is a device that generates random bits from a physical process, rather than by means of an algorithm. A hardware RBG typically consists of a transducer to convert some aspect of the physical phenomena to an electrical signal, an amplifier and other electronic circuitry to increase the amplitude of the random fluctuations to a measurable level, and some type of analog-to-digital converter to convert the output into a digital number, often a simple binary digit 0 or 1. By repeatedly sampling the randomly varying signal, a series of random numbers or bits is attained.

The microplasma system investigated in accordance with the present invention was initially generated between the tip of a needle electrode and a concentrated anolyte or catholyte of moving interface using low DC voltages. From the dynamic analysis of its current time series in terms of phase-space portrait, fractal dimension, largest Lyapunov exponent and power spectra, it was established that the electrochemical plasma undergoes a transition from quasi-periodic to chaotic and hyper-chaotic behavior as the applied voltage is increased. It was also shown that by using larger voltages, the binary sequences generated from the current-time signals unambiguously pass all needed 15 tests of NIST Statistical Test Suite and thus qualify as random sequences. However, despite these promising results, the fact that liquids and evaporated corrosive gases were involved in the microplasma process, posed limitations on their portability, packaging and ease-of-maintenance.

In order to overcome some of these limitations, the present invention relies on the use of current fluctuations in atmospheric pressure air microplasma as a source of entropy for RBG. The present invention deals with the design and testing of a high-speed TRBG system using electric current time-series data measured from an atmospheric pressure air microplasma acting as the source of entropy. In an embodiment of the present invention, a stand-alone air-gap microplasma system is considered as a physical source of entropy for a TRBG which offers many desirable attributes such as high-rate throughput, ease of implementation, and resistance to external attacks. In addition, the system is very cost-effective when compared to optical entropy sources, and apart from a simple binarization process, does not require any digital post-processing on the generated bits for them to pass all 15 tests in NIST Statistical Test Suite.

The proposed system is composed of a circuit powered by a low voltage DC supply and generating a high voltage (the high-voltage value for the air-gap plasma system it is between 5 kV and 8 kV) microplasma between two electrodes in open air, and a high-resolution, wide-bandwidth passive current sensor interfaced to a computer via a high-speed data acquisition module. The complete system is fully automated through a software script. After simple binarization (direct decimal to binary conversion only) of the measured current time series data, the bit streams pass all 15 tests under NIST 800-22 Rev. 1a Statistical Test Suite with a confidence interval of 99% without the need for any post-processing of the binary data. This TRBG is resilient to external power supply attacks because the microplasma is generated at the very high voltage side of the circuit. This TRBG can be used for applications that require portable and high-throughput random bits such as cryptographic systems, communication systems, statistical analysis and instrumentation.

The present invention aims to generate high-throughput and reliable true random bits while totally eliminating the following limitations of comparable traditional systems: the use of optical sources and associated components, and the need for digital post-processing of the binarized data in order to qualify the bit streams as random sequences. In addition, the proposed system is portable, low-cost, and operates from a single battery. This is the first TRBG (to be designed and tested successfully) based on using atmospheric pressure air microplasma (rather than liquid plasma) as an entropy source. The present invention while maintaining high-speed and reliability requirements also does not rely on optical emissions but rather on electric current time series data resulting from microplasma discharge in open air. This system further generates microplasma using a simple high-voltage generator switching circuit powered by a low-voltage DC power supply (e.g., rechargeable 3.7V, 2.2 Ah Li-ion battery), and provides true random bits (TRBs) without the need for post-processing (at rates that exceed 100 Mbit/s, depending on the bandwidth of the current probe and sampling rate of the data acquisition module) and passes all 15 NIST standard randomness tests with a 99% confidence.

Further, the proposed system is highly immune to possible external attacks such as power supply attacks, due to the high-voltage required to create the microplasma (which is in the order of a few kVs), is light-weight and small in size which makes it portable and easy to handle. The aforementioned features of this invention are important considering that the system is solely based on electrical measurements which means that all associated limitations of complex optical and optoelectronic systems are avoided, is compact in size, weight and power consumption (e.g. a single rechargeable 3.7V, 2.2 AH Li-ion battery is sufficient to maintain operation to collect hundreds of millions of data points) and is successful at generating TRBs without the need for any software or hardware post-processing. The throughput is limited only by the bandwidth of the current probe and the sampling rate of the data acquisition module.

Microplasma can be associated with strong, visible arcing or non-visible arcing by the naked eye. The proposed invention is operational in both conditions. However, in the case of visible arcing, high temperature will occur at the electrode tips and the device should not be switched on for a long period of time (typically 5-10 seconds) which is more than enough to collect the required data. The non-visible arcing operating scheme is preferred because no heating effects take place and visible light cannot be seen with the naked eye when the plasma occurs in this case (no optical detection is involved in this invention). No-arcing simply implies increasing the separation distance between the microplasma electrodes.

FIG. 1 depicts a photograph of a typical battery-powered atmospheric pressure air microplasma system prototype designed and investigated in accordance with the present invention. Two needle-like electrodes or plasma electrodes 102 (of 1 mm in diameter) are aligned facing each other at a distance of about 1 mm to 1 cm. An arc discharge is ignited and sustained in free air between the two electrodes 102 by applying a high voltage. The high-voltage power supply module consists of a high-power MOSFET transistor 104, a step-up transformer 106, a diode and an RC filter powered by a 3.5 mAh rechargeable lithium-ion battery (LIB) 108. The arc current is measured using a high-frequency, high sensitivity Tektronix CT2 differential current probe 110 (1.2 kHz to 200 MHz bandwidth at a sensitivity of 1 mA/mV into 50Ω) connected via a P6041 BNC probe cable or current probe output 112 to a Diligent Discovery 2 (DD2) data acquisition board with a maximum of 100 MS/s sampling rate (this board is not part of the invention and can be replaced by higher sampling rate boards if needed). The board is connected via USB 2.0 to a PC for saving the collected data. The maximum capacity of DD2's internal buffer is 16384 samples at a time.

Figure 2:
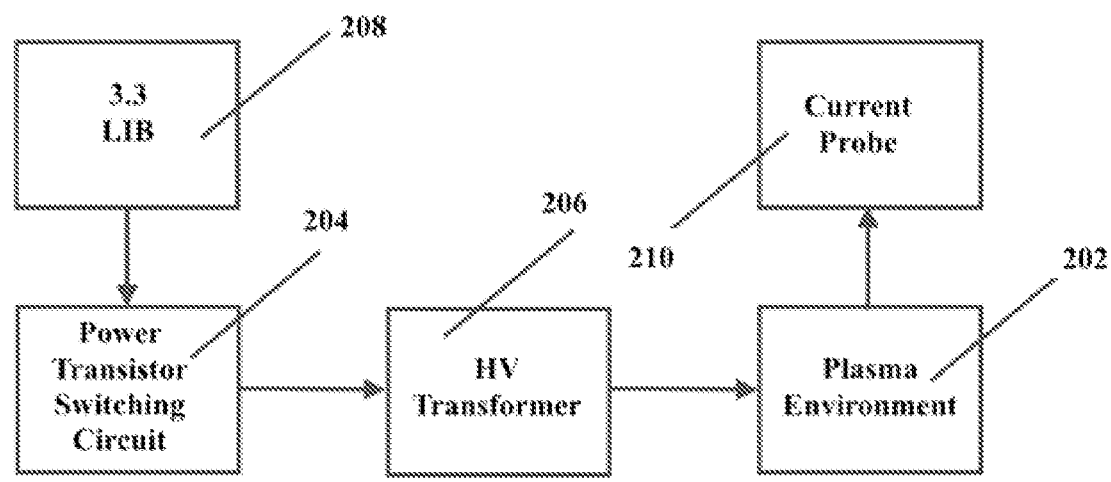
FIG. 2 depicts a photograph of a second prototype of a battery-powered atmospheric pressure air microplasma system designed and investigated for random bit generation, in accordance with the present invention.

FIG. 2 depicts a photograph of a second prototype atmospheric pressure air microplasma system designed and investigated for random bit generation, in accordance with the present invention. Two needle-like electrodes of 1 mm in diameter are aligned facing each other at a distance of about 1 mm to 1 cm, creating a plasma environment 202. An arc discharge is ignited and sustained in free air between the two electrodes by applying a high voltage. The high-voltage power supply module consists of a high-power MOS or Bipolar transistor 204, a step-up transformer 206, a diode and an RC filter powered by a rechargeable lithium-ion battery (LIB) 208. The arc current passing through the high-voltage secondary side of the transformer is measured using a high-frequency, high-sensitivity current probe (1 kHz to 200 MHz bandwidth at a sensitivity of 1 mA/mV into 50Ω) 210 connected to a data acquisition board with 100 MS/s sampling rate (this board is not part of the invention and can be replaced by higher sampling rate boards). The board is connected via USB to a PC for saving the collected data. A C-language script is used to collect and save the measured current samples automatically and iteratively. The two prototypes in FIG. 1 and FIG. 2 serve to validate the repeatability of the random bit generator circuit.

Figure 3:
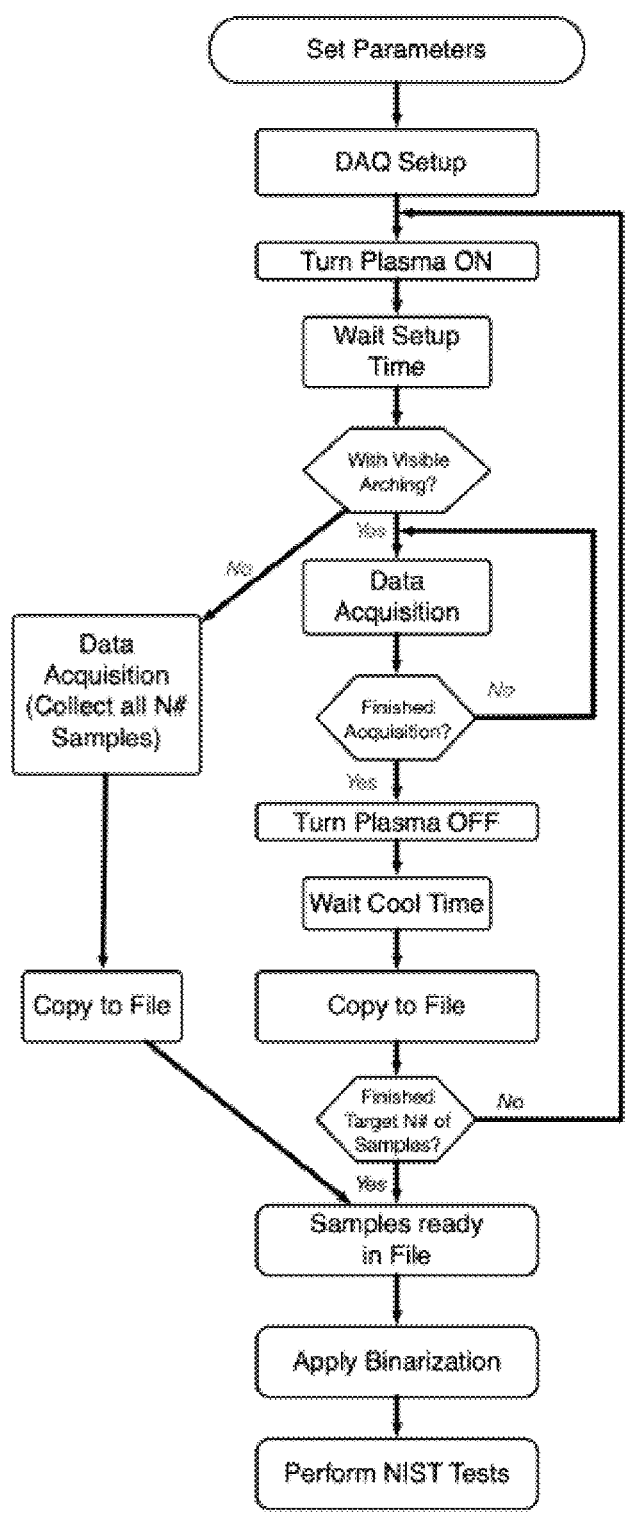
FIG. 3 is a flow chart illustrating a complete sequence of operation in accordance with the present invention.
Figure 4:
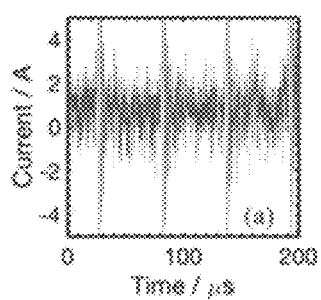
FIG. 4 ($a$) is a graphical depiction of a typical sample of current time-series collected from the atmospheric pressure air microplasma system at a rate of 100 MS/s, in accordance with the present invention.
Figure 4:
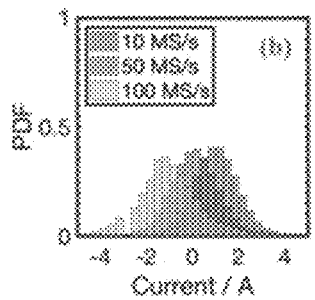
Figure 4:
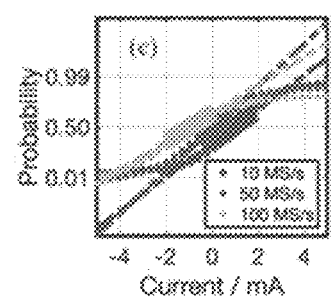
Figure 4:
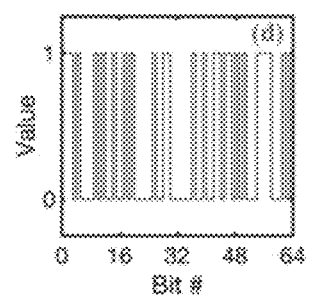
Figure 4:
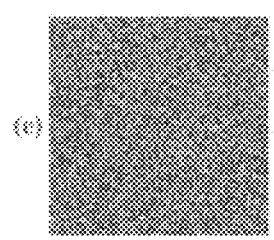
Figure 4:
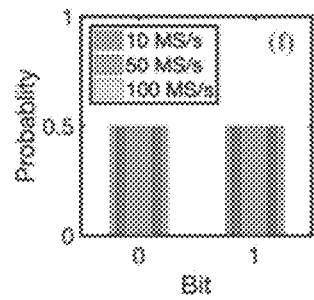

To acquire longer bit streams needed for applying the NIST tests, a C script was used to collect and save the 16384 samples iteratively to reach a target number of samples, as shown in the flow chart shown in FIG. 3, which illustrates the complete sequence of operation. A total of 16 to 24 million samples were collected in several data batches, each containing 8 million samples where the plasma is kept continuously ON.

Upon the application of a high enough DC voltage, a current channel or an arc was established between the cathodic and anodic tips of the system through electron thermionic emission or field emission (or both from the cathode). A typical 200 μs-sample of current time-series ($j_1$, $j_2$, to $j_n$) at ($t_1$, $t_2$, to $t_n$) collected with a time resolution of 32 ns from the microplasma system is shown in FIG. 4(a)—typical sample of current time series collected from the atmospheric pressure air microplasma system at a rate of 10 MS/s. The signal exhibits alternating current spikes and constrictions of different durations (or different frequencies) and relatively low intensities superseding each wave of high spikes (in the order of a few amperes) corresponding to the transformer charging-discharges responses. This type of sustained erratic behavior was consistently observed irrespective of the orientation of the system of electrodes (i.e. horizontal, vertical, or in between) as long as a small distance of about 1 mm between the two was maintained. An increase of this distance weakened the plasma arc current. The source of these current fluctuations are closely related to the complex energy transfer processes occurring in the gas plasma, in addition to contributions from particles (positively and negatively charged, and neutral species) production or loss which resulted from numerous possible chemical reactions.

These production or loss processes are nonlinear, collision dominated, and take place with different kinetics and rate coefficients. Also, particles have different diffusion coefficients and mobilities within the gas medium, which makes the overall plasma state and the resulting current signal in particular very difficult to predict. These fluctuations in current dynamics are usually linked to other fluctuations, such as pressure, plasma speed, and optical emissions. It should also be noted that practically, other environmental and experimental sources of disturbances may add up coming from air flow turbulence, temperature noise, power supply ripples, etc.

Due to this inherent complexity in microplasma systems, a few theoretical attempts have been carried out to explain the origin of such fluctuations. For instance, it was traditionally demonstrated from basic governing equations (i.e. conservation equations of mass, momentum, energy, and metal vapor concentration, together with Maxwell's equation), that an amplitude equation describing the temporal evolution of perturbations of the plasma field quantities may be written as a third-order nonlinear differential equation of the form:

$$\dddot{A} + \mu_2 \ddot{A} + \mu_1 \dot{A} + \mu_0 A = kA^3 \quad (1)$$

The coefficients $\mu_i$ are control parameters which depend on the properties of the generated plasma, and k is the scaling factor. Through a judicious choice of these parameters, equation (1) (also known as the jerk equation) shows that the general feature of the dynamic behavior of individual elements of plasma field vector may exhibit low-dimensional chaos. Higher dimensional chaos (hyper-chaos) or more complex behaviors cannot be explained by such a model. It is also understood that even if the general features can be somehow depicted by such a system of equations, which is qualitatively useful for the overall understanding of the system's behavior, the exact one-to-one matching with the experiment is impossible to reproduce.

However, the binarized current time series collected from the present atmospheric pressure air microplasma system are found to be random with a probability of 99% as demonstrated below. Thus, fluctuations shown by equation (1), which are at the end initiated by deterministic equations, and therefore could be eventually controlled, are inadequate to apply here for the case of random processes. FIG. 4(b) shows histogram plots for a sample of 96000 data points (arbitrarily selected from 16 MS) collected at the rates 10, 50 and 100 MS/s in which the height of each bar is the relative number of observations (i.e., probability)—probability distribution functions of current time-series samples of 96000 data points collected at the rates of 10, 50 and 100 MS/s, while FIG. 4(c) shows probability plots, which are nicely aligned with the theoretical normal distribution N ($\mu$, $\sigma^2$)—normal probability plots of samples in (b) (dots) aligned with the theoretical normal distribution (dashed lines), the solid thick lines connect the first and third quartiles of the data. It was found, for instance, with a confidence interval of 95%, the values of $\mu$=0.81 mA and $\sigma^2$=1.18 mA$^2$ (maximum variance unbiased estimator of the variance) for the sample collected at 10 MS/s. In order to evaluate the current signal as a source of randomness, all 15 tests of the NIST Statistical Test Suite for Random and Pseudorandom Number Generators were applied on binarized data. For binarization, the data were centered around the zero-mean by applying a moving average function and removing any dc shift. Then, a base-2 representation of the absolute value of the sequence (after scaling up by $10^5$) was generated using MATLAB function dec2bin. Finally, the binary sequence was built using the least significant bit of each data point.

Some statistical information on the binarized data are given in FIG. 4(d)-4(f) which show uniform distribution for bits '0' and '1' (FIG. 4(f)), and wherein probability of occurrence is P(0)=P(1)=0.5 for each rate. (FIG. 4(d) showing bit values of a sequence of 64 successive bits in a 1D stair plot (from the 10 MS/s current time series), FIG. 4(e) showing 2D raster image of the first 400×400 bits (generated from the 10 MS/s current time series) which does not show any particular concentration of pockets or patterns of zeros or ones and FIG. 4(f) displaying histograms of 24576000-long bit streams generated from current time series collected at 10, 50 and 100 MS/s). The number of times the bit '0' is generated was also computed knowing that the previous one was a '0' (denoted '00') and the same for '01', '10' and '11' (conditional probability P(x|y)). It was determined in a sample size of 24576000 bits generated from the current time series collected at the rate of 10 MS/s the respective times of occurrences of 6148108, 6142061, 6142062 and 6143768. These values corresponded to the probabilities 0.2502, 0.2499, 0.2499 and 0.2500 for '00', '01', '10' and '11' respectively, meaning that there is no particular preference to any of them and thus no form of memory of at least the prior state during the bit generation process. Higher-order correlation could be established from auto-correlation analysis.

In an embodiment of the present invention, for the execution of the NIST randomness tests, the following parameters were used. $\alpha$=0.01 (significance level), block length for the Block Frequency test is M=128, block length for the Non- Overlapping Template test is m=9, block length for the Overlapping Template test is m=9, block length for the Approximate Entropy test is m=10, block length for the Serial test is m=16, block length for the Linear Complexity test is M=500. Table 1 summarizes the statistical results from NIST randomness tests of a typical 24 M bit-long bitstream (larger than the recommended size for all NIST tests) obtained from binarized current signal, displaying typical results of NIST tests for 24 Mbit-long bit streams generated from the microplasma current time series at three sampling rates (2 MS/s, 50 MS/s and 100 MS/s). The inter-electrode distance is approximately 1 mm. The tests were performed using 50 sequences of 480000 bits. The P-value, defined as the probability that a perfect random number generator would have produced a sequence less random than the tested sequence and associated with each test, is larger than $\alpha=0.01$ for all tests. This indicates that the sequence is considered to be random with a confidence of 99% from the point of view of the specific test. In the table, this is indicated by a 'success'. If $P<\alpha$, then the null hypothesis H0 that the sequence is truly random is rejected, and therefore it is not considered to be random, also from the point of view of the specific test. The proportion of sequences that passed the tests for the values of P value are also given in the table. The proportion should be greater than $p\tilde{} - 3\sqrt{p\tilde{}(1-p\tilde{})/m}$, where $p\tilde{}=1-\alpha$ is the complement of the significance level and m is the sample size. Considering the present case where m=50 (most of the tests in Table 1) and $\alpha=0.01$, the proportion should lie above 0.947786, which means a minimum pass rate of approximately 47/50 binary sequences.

The performance of the microplasma system was also tested at higher rates for RBG, which is useful not only for increasing the throughput but also for limiting the ON time of plasma system and hence increasing its lifetime. In particular, the system with 50 MS/s and 100 MS/s sampling rates was tested. Some statistical information on the current time series and binarized data obtained at these two rates are shown in FIGS. 4(b), (c) and (f). The corresponding results for NIST tests are reported in Table 1, which confirm the randomness of the generated bit streams up to 100 MS/s sampling rate. This sampling rate is the limit of the used hardware data acquisition system. Nonetheless, at this sampling rate, the time taken to collect all 16 M data points was just 3.3 seconds, in addition to approximately 2.0 seconds needed by the relay to switch the plasma ON and get it stabilized.

Figure 5:
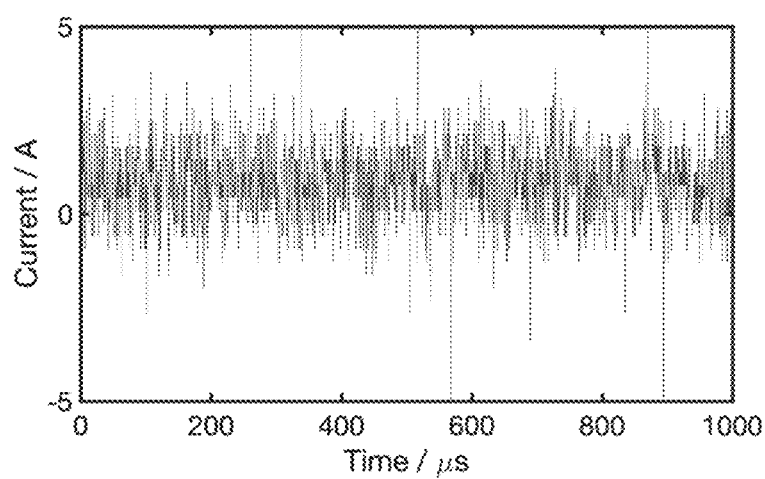
FIG. 5 shows a typical sample of current time series, in accordance with the present invention.

Finally, in order to see how the NIST tests of randomness are affected if the inter-electrode distance is increased, the scenario wherein the two electrodes were pulled apart to about 2 cm was considered. At this separation distance, an acoustic signal emanating from the microplasma environment could be heard but no visible optical emissions were observed with the naked eye. In spite of that, the resulting current time series still appeared to be intermittent and disorganized as shown in FIG. 5. The NIST tests conducted on the binarized data following the same procedure aforementioned were all passed (with $P>\alpha=0.01$ and proportion pass rate larger than the minimum) as shown in Table 2. This demonstrates that the inter-electrode distance has, to a certain extent, little effect on the RBG performance of our atmospheric pressure air microplasma system. In addition, because the high current spikes observed when visible arc plasma was in place are considerably reduced, this in turn reduces the degradative effects of electrodes over-heating.

TABLE 1

| | 10 Mbit/s | | | 50 Mbit/s | | | 100 Mbit/s | | |
|---|---|---|---|---|---|---|---|---|---|
| Statistical test | P-value | Proportion | Result | P-value | Proportion | Result | P-value | Proportion | Result |
| Frequency | 0.739928 | 50/50 | success | 0.137283 | 50/50 | success | 0.739918 | 49/50 | success |
| Block Frequency | 0.779288 | 50/50 | success | 0.911413 | 49/50 | success | 0.122825 | 50/50 | success |
| Cumulative Sums | 0.418023 | 50/50 | success | 0.213309 | 50/50 | success | 0.534246 | 49/50 | success |
| Runs | 0.202219 | 49/50 | success | 0.779188 | 50/50 | success | 0.023545 | 49/50 | success |
| Longest Run | 0.383827 | 50/50 | success | 0.13681 | 47/50 | success | 0.035716 | 50/50 | success |
| Rank | 0.383827 | 50/50 | success | 0.455937 | 50/50 | success | 0.816537 | 50/50 | success |
| FFT | 0.419021 | 50/50 | success | 0.122325 | 48/50 | success | 0.657933 | 49/50 | success |
| Non Overlapping Template | 0.383827 | 47/50 | success | 0.419021 | 50/50 | success | 0.616395 | 48/50 | success |
| Overlapping Template | 0.935718 | 49/50 | success | 0.739918 | 49/50 | success | 0.191887 | 50/50 | success |
| Universal | 0.739918 | 50/50 | success | 0.574903 | 50/50 | success | 0.419021 | 50/50 | success |
| Approximate Entropy | 0.883171 | 49/50 | success | 0.066882 | 49/50 | success | 0.289007 | 50/50 | success |
| Random Excursions | 0.002071 | 15/15 | success | 0.634308 | 26/26 | success | 0.911413 | 22/22 | success |
| Random Excursions Variant | 0.437274 | 15/15 | success | 0.01265 | 26/26 | success | 0.123325 | 22/22 | success |
| Serial | 0.262240 | 49/50 | success | 0.657933 | 49/50 | success | 0.770188 | 48/20 | success |
| Linear Complexity | 0.23681 | 49/50 | success | 0.383827 | 47/50 | success | 0.699313 | 50/50 | success |

TABLE 2

| | 2 Mbit/s | | | 50 Mbit/s | | | 10 Mbit/s | | |
|---|---|---|---|---|---|---|---|---|---|
| Statistical test | P-value | Proportion | Result | P-value | Proportion | Result | P-value | Proportion | Result |
| Frequency | 0.002043 | 99/100 | success | 0.798139 | 98/100 | success | 0.574903 | 98/100 | success |
| Block Frequency | 0.366918 | 99/100 | success | 0.554420 | 100/100 | success | 0.816537 | 99/100 | success |
| Cumulative Sums | 0.236810 | 99/100 | success | 0.595549 | 99/100 | success | 0.401199 | 98/100 | success |
| Runs | 0.867692 | 99/100 | success | 0.401199 | 100/100 | success | 0.055361 | 99/100 | success |
| Longest Run | 0.012850 | 99/100 | success | 0.096578 | 100/100 | success | 0.999438 | 99/100 | success |
| Rank | 0.289667 | 99/100 | success | 0.319084 | 99/100 | success | 0.834308 | 100/100 | success |
| FFT | 0.236810 | 97/100 | success | 0.236810 | 99/100 | success | 0.236810 | 100/100 | success |
| Non Overlapping Template | 0.0055361 | 96/100 | success | 0.5341416 | 99/100 | success | 0.891163 | 99/100 | success |
| Overlapping Template | 0.455937 | 98/100 | success | 0.319084 | 100/100 | success | 0.616305 | 100/100 | success |

TABLE 2-continued

| Statistical test | 2 Mbit/s | | | 50 Mbit/s | | | 10 Mbit/s | | |
| --- | --- | --- | --- | --- | --- | --- | --- | --- | --- |
| | P-value | Proportion | Result | P-value | Proportion | Result | P-value | Proportion | Result |
| Universal | 0.534146 | 10/10 | success | 0.739918 | 10/10 | success | 0.213309 | 10/10 | success |
| Approximate Entropy | 0.946308 | 100/100 | success | 0.085587 | 100/100 | success | 0.224821 | 100/100 | success |
| Random Excursions | 0.350485 | 16/16 | success | 0.275709 | 22/22 | success | 0.012650 | 15/15 | success |
| Random Excursions Variant | 0.035174 | 16/16 | success | 0.739918 | 21/22 | success | 0.275709 | 15/15 | success |
| Serial | 0.574903 | 100/100 | success | 0.897763 | 99/100 | success | 0.935716 | 99/100 | success |
| Linear Complexity | 0.455937 | 99/100 | success | 0.153763 | 99/100 | success | 0.616305 | 100/100 | success |

The use of a battery-powered atmospheric pressure air microplasma system was demonstrated as a portable and inexpensive source for high-rate TRBs. The inherently unpredictable nature of the microplasma current time series was relied on as a source of entropy. The generated sequences at rates up to 100 Mbit/s successfully passed all 15 statistical tests under NIST 800-22 Rev. 1a with a confidence of 99%. However, for extended longevity and reliability of the device, it is recommended to monitor the degradative electrode erosion effect which results from particle bombardment and associated local heating. These effects were minimized by limiting the plasma ON time to a few seconds, and/or by increasing the inter-electrode separation to limit the plasma current. Even so, all 15 NIST tests were passed successfully with P-values>0.01 and proportions pass rate larger than the minimum.

In another embodiment, the associated optical and acoustic signals of the atmospheric pressure air microplasma system also generate high-rate fluctuations that need to be investigated using non-linear time series analysis and statistical tests for randomness. Furthermore, preliminary tests have shown that the binarization procedure can be completely avoided while using directly the bits generated by the sampling analog-to-digital converter in the data acquisition module.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims which follow.

The invention claimed is:

1. An atmospheric pressure air gap microplasma system designed for random bit generation, comprising:
a plurality of plasma electrodes;
a dc power supply module supplying a voltage for igniting an arc discharge between the plurality of plasma electrodes, wherein the ignited arc discharge results in establishing and sustaining an electric current channel between the plurality of plasma electrodes;
a passive current probe for measuring and collecting electric current time series data of the electric current channel; and
a data acquisition board connected to the current probe for saving the collected electric current time series data, wherein binary sequences are generated from the electric current time series data.

2. The atmospheric pressure air gap microplasma system of claim 1, wherein two plasma electrodes are aligned facing each other at a distance of 1 mm to 1 cm.

3. The atmospheric pressure air gap microplasma system of claim 2, wherein the two plasma electrodes are two needle-like electrodes.

4. The atmospheric pressure air gap microplasma system of claim 1, wherein the binary sequences are generated through a direct decimal-to-binaryconversion of the electric current time series data.

5. The atmospheric pressure air gap microplasma system of claim 1, wherein the generated binary sequences are proved to pass all 15 tests of NIST Statistical Test Suite SP 800-22 and are thereby suitable for random bit generator applications.

6. The atmospheric pressure air gap microplasma system of claim 5, wherein the generated binary sequences are suitable for random bit generator applications without requiring post-processing of the generated binary sequences.

7. The atmospheric pressure air gap microplasma system of claim 1, wherein the atmospheric pressure air gap microplasma system is battery-powered thereby resulting in a portable and inexpensive source for true random bit generation (TRBG).

8. The atmospheric pressure air gap microplasma system of claim 1, wherein the atmospheric pressure air gap microplasma system further comprises a MOSFET transistor, a step-up transformer, a diode and an RC filter powered by a rechargeable lithium-ion battery.

9. The atmospheric pressure air gap microplasma system of claim 1, wherein the data acquisition board is further connected to a computer.

10. The atmospheric pressure air gap microplasma system of claim 1, wherein the arc current channel is established between tips of the plurality of plasma electrodes, through electron thermionic emission and/or field emission.

11. The atmospheric pressure air gap microplasma system of claim 1, wherein the atmospheric pressure air gap microplasma system is resilient to external power attacks.

12. The atmospheric pressure air gap microplasma system of claim 1 for random bit generation, wherein the ignited arc discharge is visible or non-visible with the naked eye.

13. A true random bit generator (TRBG) using atmospheric pressure air gap microplasma as a source of entropy for random bit generation, the true random bit generator comprising:
a generator switching circuit for generating a high-voltage microplasma between two electrodes in open air, thereby eliminating a need for optical source and components for random bit generation by establishing and sustaining an electric current channel between the two electrodes, wherein the generator switching circuit is powered by a long voltage DC supply.

14. The true random bit generator (TRBG) of claim 13, wherein the true random bit generator (TRBG) relies on a use of current fluctuations in the atmospheric pressure air gap microplasma as the source of entropy for random bit generation.

15. The true random bit generator (TRBG) of claim 13, wherein electric current time series data measured from the atmospheric pressure air gap microplasma is used as the sole source of entropy for random bit generation.

16. The true random bit generator (TRBG) of claim 13, wherein the true random bit generator (TRBG) eliminates a need for digital post-processing of binarized data in order to qualify bit streams for random bit generator applications.

17. The true random bit generator (TRBG) of claim 13, wherein the true random bit generator (TRBG) further comprises a passive current sensor interfaced to a computer via a data acquisition module.

\* \* \* \* \*